April 14, 1942.  E. A. VOGEL  2,279,538
IMPULSE COUPLING
Filed Nov. 10, 1939
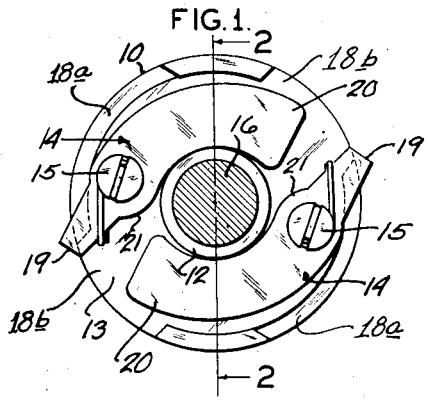
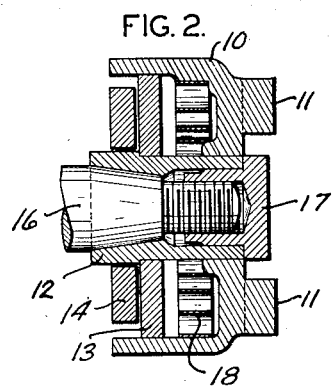
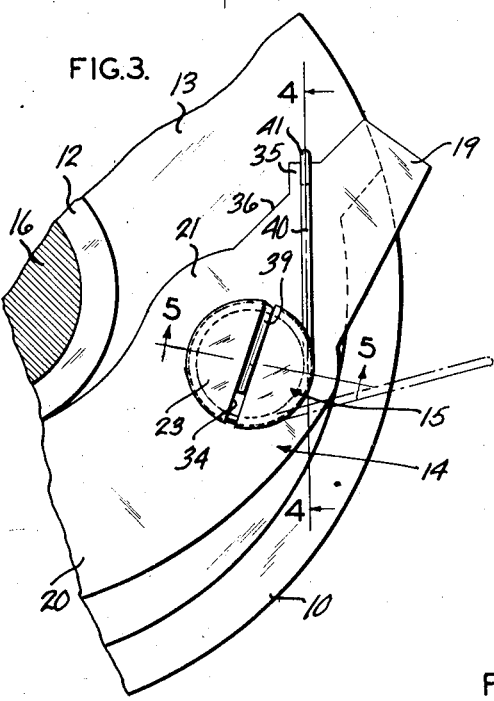
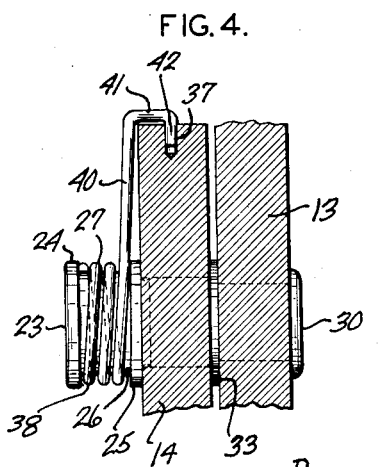
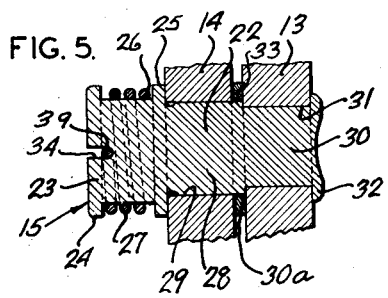
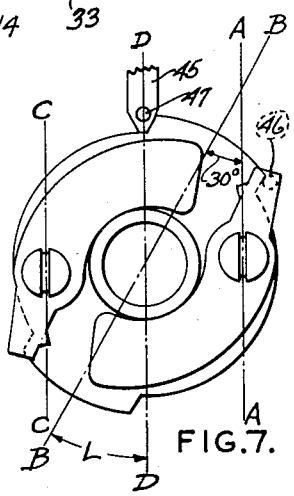
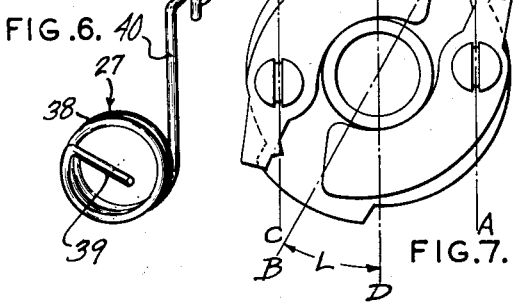
INVENTOR
EDWARD A. VOGEL
BY Paul L. Krohn
ATTORNEY.

Patented Apr. 14, 1942

2,279,538

UNITED STATES PATENT OFFICE 2,279,538

IMPULSE COUPLING

Edward A. Vogel, Beloit, Wis., assignor to Fairbanks, Morse & Co., Chicago, Ill., a corporation of Illinois Application November 10, 1939, Serial No. 303,928

2 Claims. (Cl. 171—209)

This invention relates to impulse couplings for engine-driven magnetos, and has particular reference to improvements in the construction and arrangement of certain operating parts of the coupling, effective to greatly improve the function and reliability of the coupling in operation.

The principal object of the invention is to provide, in an impulse coupling of the type employing one or more weighted pawl elements for controlling the impulse operation of the coupling, spring-tensioning means effective to bias the pawl to an impulse-operative position, the arrangement thereof, relative to the pawl, being such as to preclude any binding or cocking of the pawl by the spring means.

Another important object resides in the provision, in an impulse coupling of the character described, of spring-tensioning means effective upon the pawl for the purpose indicated, as to urge the pawl to an impulse-operative position, in any assembly position of the magneto and coupling relative to the engine, as for example, with the coupling axis in a horizontal or a vertical plane.

A further object is to provide an improved spring-biased pawl assembly for an impulse coupling, in which a torsion type of spring is applied to a pivoted coupling pawl in a manner such as to smoothly and uniformly load the pawl, to bias the same toward its impulse controlling position.

Yet another object is attained in connection with a spring-loaded pawl assembly for an impulse coupling, in improved provisions for mounting a spring of torsional type, and applying it as a biasing load upon the pawl, the provisions for so mounting and applying the spring being such as to facilitate its assembly to or removal from the coupling organization, merely by proper manipulation of the spring per se, and without requiring initial dis-assembly of any of the coupling elements to effect the same.

Other objects and advantages of the present invention will appear from the following description of a preferred embodiment thereof when read in connection with the accompanying drawing, in which:

Fig. 1 is a plan view of an assembled impulse coupling showing the improved pawl biasing means in operative position; Fig. 2 is a longitudinal sectional elevation of the coupling as viewed from line 2—2 in Fig. 1; Fig. 3 is an enlarged, fragmentary plan view of the coupling as appears in Fig. 1; Fig. 4 is a fragmentary sectional elevation as taken at line 4—4 in Fig. 3; Fig. 5 is another fragmentary sectional elevation as taken at line 5—5 in Fig. 3; Fig. 6 is a detail showing of the pawl spring which constitutes an important element of the present invention, and Fig. 7 illustrates the application of the pawl supporting member of the coupling to a jig of a milling machine, preparatory to forming the spring anchoring recesses in the pawl pivot elements, the illustration also indicating the directioning of the pivot recesses relative to the pawl supporting member and the pawls thereon, through which is determined the initial tension of the pawl biasing springs in application to the pawls.

Referring to the drawing by suitable characters of reference, there is illustrated in Figs. 1 and 2, a well known form of impulse coupling suitable for use with an engine-driven magneto. The coupling is of a type employing weighted pawls as the impulse controlling elements thereof, which pawls are adapted for alternate engagement with a stop member or post (not shown) preferably carried upon the frame of the magneto (not shown). Describing briefly the essential elements of the coupling as shown, it includes a centrally or axially apertured, cup-shaped driven member 10 provided with lugs 11 for driven association with an operating part of an engine (not shown). Freely journalled in the central aperture of the member 10, is a tubular hub or sleeve-like member 12 which carries a plate or disc 13 rigidly secured thereto in any suitable manner. Disc 13 in turn, carries pawl members 14 pivotally mounted thereon, as by pivot means 15. Sleeve 12 is adapted for mounting upon the tapered end of shaft 16 of the magneto (not shown) and is securely retained thereon by means of a nut 17 threadedly engaging the end portion of shaft 16 and abutting the adjacent end of the sleeve 12. Within the member 10 is the coupling spring 18 which constitutes the resilient means for connecting the member 10 in driving relation with the sleeve 12, as is well understood. From this it will be observed that, with respect to the impulse coupling, per se, the member 10 may be considered as the driving element and the sleeve 12 with disc 13 carried thereby, as the driven element of the coupling. In assembly, these elements, as coupled by the spring 18, have a limited relative movement, the limit of which is determined preferably by the arcuate extent of opposed recesses 18a in the periphery of the cup member 10, which receive diametrically opposed projections 18b on the disc 13 (Fig. 1). Such an arrangement for limiting the relative movement of the coupling elements is in accordance with well known practice.

Turning to the pawl assembly on the disc 13, the features of the present invention are embodied therein, and include a spring-biasing means acting upon the pawl to urge it toward an impulse-operative position, as will hereinafter appear. As shown in Fig. 1, the coupling is provided with a pair of pawls 14, mounted for pivotal movement at diametrally opposite points on the disc 13. However, a description of one thereof and the improvements affecting the same, will suffice for both, since they are identical in form and arrangement.

The pawl 14 is formed to provide a stop-engaging end portion 19 and a weighted-tail portion 20 extending oppositely from an intermediate pawl-section 21, in which section is effected the pivotal support of the pawl, as through the pivot means 15. The pivot means 15 is comprised of a pivot pin 22 upstanding from the disc 13 and having a head section 23 including axially spaced, circumferential flanges 24 and 25 providing therebetween, a seat portion 26 for receiving a coil type torsion spring 27 later to be described. Inwardly of the head section and adjacent the inner flange 25, is a journal section 28 which in the pivotal assembly of the pawl 14 thereto, is received in a pawl aperture 29 provided in the pawl section 21, thereby effecting a free, pivotal mounting of the pawl on the pin. The end portion 30 of the pin, opposite the head section 23, is preferably of reduced diameter, providing a shoulder 30a inwardly of the said end and in the zone of the pawl bearing section 28. In the assembly of the pawl and pin to the coupling disc 13, the pin end 30 is seated in an aperture 31 provided therefor, in the disc 13, with the pin shoulder 30a in abutment with the disc, as shown. The pin end 30 may be secured in the disc aperture 31 in any suitable manner, as by a press-fit therein, while its end portion 32 may be turned or peened-over against the inner face of the disc, and welded thereto, if desired. As readily appears in the drawing, particularly Figs. 4 and 5 thereof, the axial extent of the pawl bearing section 28, as between the flange 25 and the pin shoulder 30a, is by preference, greater than the thickness of the pawl section journalled on the pin 22, such that a spacer element or washer 33 may be included in the pin and pawl assembly to the disc 13, and located on the pin 22 between the pawl 14 and disc 13. The washer thereby serves to prevent frictional or rubbing contact between the latter elements. Moreover, the thickness of the washer may be such as to permit some slight but desirable freedom of movement or displacement of the pawl on the pin section 28, in the axial direction of the latter, whereby to precludes any binding of the pawl.

As clearly appears in Figs. 3 and 5, the pivot pin head section 23 is provided with a groove 34 extending transversely along a diameter of the pin head, and being of a depth to extend inwardly of the head flange 24, into the zone of the spring-receiving seat 26. The groove serves to receive and anchor to the pin, one end of the spring 27, as will later appear. In assembling the pivot pin and its pawl to the coupling disc 13, it is preferred to position the pivot pin such that the groove 34 in the pin head, has its axis directed toward the axis of the diametrally opposed disc projections 18b and intersecting the latter as a predetermined desired angle. The relationship thus indicated is illustrated in Fig. 7 wherein the axis of the pivot pin groove is represented by the extended broken line A—A and the axis of the disc projections by the extended broken line B—B, the two lines intersecting at a desired angle, say 30 degrees as shown in the present example. The disc projections and more particularly, the axis B—B of these projections, thus provides an index by which the directioning of the pin groove may be determined, in the assembly of the pin and pawl elements to the coupling disc 13. The same relation obtains, of course, in respect to the axis of the groove in the opposite pivot pin, the axis thereof being represented by the broken line C—C in Fig. 7. Such positionment of the pin grooves is utilized as will appear hereinafter, to determine the desired initial tension of the springs 27 upon the pawls 14, when the latter are disposed in a predetermined position relative to the coupling disc 13.

With further reference to the head grooves 34 in the pawl pivots 22, and the directioning thereof relative to the disc 13, as above described, it is to be noted here that in practice and to facilitate manufacture of the coupling, the head grooves are formed in the pivots after assembly of the pawls and pivots to the disc 13, as by a milling machine operation on the pivot heads. Accordingly and again referring to Fig. 7, the coupling disc 13 with the pawls and pivot pins mounted thereon, is held in place in a milling machine (not shown), as by a suitable jig the structure of which is not shown except for the disc locating elements 45 and 46 thereof. These elements which may be adjustable, are spaced to receive therebetween, one of the projections 18b of the disc 13. The locating element 45 is pivoted upon a pin 47, the pin serving as a reference point such that a line D—D parallel to the line of travel of the milling machine cutters or milling wheels (not shown), and passing through the pin 47, will intersect the diametral axis B—B of the disc projections 18b at a given angle L, the angle in the present example being 30 degrees. Thereafter, the milling operation may be completed to form the grooves 34 in the pin heads, the lines of travel of the milling cutters coinciding, of course, with corresponding diameters of the pin heads, as with the axes A—A and C—C (Fig. 7). Hence the axes of the pin grooves will intersect the disc axis B—B each at an angle equal to the angle L as predetermined in setting up the disc 13 in the milling machine jig.

Pivotally actuating the locating element 45 will effect a shifting of the coupling disc, to increase or decrease the angle L within a limited range, so that in milling the grooves 34, the axes thereof will intersect the disc axis each at an angle corresponding to the angle L as it is altered in value, according to the degree of shifting of the coupling disc by the locating element 45. As before indicated, the axial directioning of the grooves 34 in the pawl pivots, relative to the diametral axis of the disc projection 18b, determines the initial tension of the pawl biasing springs, effective upon the pawls when disposed in stop-engaging positions, as appears in Figs. 1 and 3.

Referring in particular to Figs. 3 and 4, the pawl 14 has a projection or boss 35 formed on the longitudinal side portion 36 of the pawl end 19, and provided in the boss is a circular aperture or recess 37 adapted for receiving an end of the spring 27. The location of the recess in the pawl boss is preferably such that, in the pivotal assembly of the pawl to the coupling, its axis is substantially on a line tangent to the surface of the spring-mounting seat 26 of the pivot pin 22.

The pawl biasing or loading spring 27 of a preferred form suitable to the pivoted pawl assembly shown, is illustrated in Fig. 6. It is comprised of a spring-body 38 of coil type, one end 39 of which is inturned, along a diameter of the coil. The opposite end 40 projects laterally and appreciably outwardly, beyond the coil, in a direction tangentially to the spring coil, and preferably at a substantial angle to the inturned spring-end 39. The spring end 40 terminates in a hook-like portion 41, the terminal portion 42 of which is adapted for seating in the pawl recess 37. The spring structure as shown in Fig. 6, discloses the arrangement of the spring ends relative to each other and to the coil body, which obtains when the spring is in a natural, unstressed condition.

Assembly of the spring to the pawl and its pivot, is effected by passing the spring body 38 over the pin flange 24 and seating it upon the pin seat 26 provided therefor, such that the inturned spring end 39 engages and seats in the pin groove 34. To facilitate seating of the spring on the pivot pin, the internal diameter of the spring coil 38 when the spring is in an unstressed state, as it appears in Fig. 6, may be substantially equal to the diameter of the pin head flange 24, so that the spring coil may be readily displaced over the flange. The opposite spring-end 40 will then project outwardly over the periphery of disc 13, as indicated in broken lines in Fig. 3. Thereafter, in order to seat the terminal 42 of the spring hook-end 41 in the pawl recess 37, the spring end or arm 40 must be displaced in a counterclockwise direction (Fig. 3), until the hook-end 41 overrides the pawl boss 35, when the pawl is disposed in its stop-engaging position as shown. The spring terminal 42 then may be seated in the recess 37. It will be appreciated from the foregoing, that as the spring arm 40 is displaced to seat the end 42 in the pawl recess 37, the coil elements of the spring become torsionally displaced in a direction effective to decrease the internal diameter of the coil body, so that in the final assembly of the spring to the pawl pivot and the pawl, the coil body will engage the pivot pin seat 26 and will be retained thereon by the head flange 24, as indicated in Figs. 4 and 5. Thus the spring is applied to the pawl in a tensioned condition, acting in a direction to urge the pawl to the position shown. It will be apparent now, that by altering the direction of the pin head grooves 34 relative to the diametral axis of the disc projections 18b, the initial tension of the springs, in the assembly of the springs to the pin and pawl elements when the latter are in stop-engaging positions as shown, may be predetermined within limits, to provide for effective loading of the pawls under given conditions of coupling usage and installation. For example, should it be desired to increase the initial tensioning of the springs, the jig setting of the coupling disc 13 (Fig. 7) may be altered through the locating element 45 in the manner heretofore indicated, to decrease the angle L from the exemplary value of 30 degrees shown. As a result, the axes of the pivot recesses will intersect the disc axis B—B each at an angle equal to the angle L as reduced, so that the final directioning of the recesses will be such as to require a longer swing of the spring arm 40 to effect a seating of its end 42 in the pawl recess 37. The initial spring tension effective upon the pawls in their stop-engaging positions as shown, consequently will be increased thereby. Increasing the angle L in the process of forming the pivot recesses 34, will produce the opposite effect in the final assembly of the springs, as to decrease the initial effective tension of the springs.

By reason of the natural pitch of the spring coils 38, the extended spring arm 40 assumes an angular relation to the plane of the adjacent pawl surface, as readily appears in Fig. 4. Accordingly, the flange 25 which separates the spring-seat and the pawl-seat on the pivot pin, may be utilized as an abutment for the spring arm 40 (Fig. 4), to maintain a predetermined spacing of the spring arm from the pawl. Hence, as will be observed now, the improved manner of mounting the spring relative to the pawl pivot and pawl, is such as to preclude cocking or binding of the spring on its pivot seat 26, the further, provides for a smooth spring action on the pawl and without causing any binding or cocking of the latter.

It will be observed now, that pivotal movement of the pawl in the direction to bring its stop-engaging end 19 inwardly of the periphery of disc 13, will immediately, further tension the coil spring 27, and the resulting spring reaction will operate to tend to pivot the pawl in the opposite direction, or toward its stop-engaging position as shown in Fig. 3. The entire arrangement is such as to attain a smooth, uniform and positive biasing action of the spring upon the pawl, wherein the spring tension thereon is a predetermined minimum when the pawl is in stop-engaging position, and increases substantially uniformly with pivotal movement of the pawl from the latter position.

From the foregoing, it will be observed also, that by reason of the improved pawl, pawl pivot and spring arrangement as herein described and illustrated, the spring may be readily assembled to or removed from the coupling without requiring initial disassembly of any of its parts, so that spring replacement may be effected solely by manipulation of the spring per se.

The present improvement provides an effective bias upon the coupling pawls, service to urge them into an impulse-controlling position during impulse operation of the coupling, the spring biasing means being overcome by the action of centrifugal force on the weighted ends of the pawls, only after the impulse function of the coupling is completed, and the true power drive connecting function of the coupling comes into play. Importantly, by reason of the improved spring bias upon the pawls, the coupling is thereby adapted for operation as intended, when mounted so that its axis is vertical or horizontal.

It is to be understood that alterations in or modifications of the structural arrangement embodied in the present disclosure of a preferred form of coupling pawl assembly, may be effected without departing from the spirit and full intended scope of the invention, as defined by the hereunto appended claims.

I claim:

1. In an impulse coupling assembly of the type described, including resiliently coupled driving and driven members, a pawl, a pivot pin secured to one of said members and upon which said pawl is mounted for pivotal movement, said pin being formed to provide a spring-receiving seat and a grooved recess extending transversely through the pin, in the zone of said seat, a coil type spring arranged in said spring seat and having one end thereof received in said grooved recess, the other end of said spring providing a spring arm projecting laterally and substantially tangentially to the spring coil, in a direction to overlie said pawl, the spring arm being spaced from said pawl, said pawl having a recess formed in a portion thereof, the longitudinal axis of said pawl recess being directed substantially tangentially to the surface of said spring-receiving seat, and said projecting spring arm terminating in a reversely bent portion adapted for seating in said pawl recess.

2. In an impulse coupling of the type described, including resiliently coupled driving and driven members, a pivot pin carried by one of said members, a projection on and located intermediate the ends of said pin, a pawl freely pivotally mounted on said pin, on one side of said projection, a coil type spring encircling said pin, on the opposite side of the projection, one end of said spring being anchored to said pin, and the opposite end thereof projecting substantially tangentially to the spring coil diagonally across the pawl but spaced from the pawl face by said pin projection, and means provided for anchoring said opposite spring end to said pawl, said means comprising a projection formed on one edge of the pawl and provided with a recess, the longitudinal axis of which is directed substantially tangentially to the surface of said pin encircled by said coil type spring.

EDWARD A. VOGEL.